(12) United States Patent
Liu et al.

(10) Patent No.: US 6,182,575 B1
(45) Date of Patent: Feb. 6, 2001

(54) ADJUSTABLE STOP-WAGON RETARDERS WITH LOCKING FUNCTION FOR WAGONS AT HIGH SPEED AND DISPOSAL METHODS THEREOF

(75) Inventors: Yongting Liu; Qian Wang; Lining Wang; Mingzhu Wang; Hongbo Yu; Peiwen Chang; Libin Zhang, all of Harbin (CN)

(73) Assignee: China TDJ System Research Centre, Heilongjiang (CN)

( * ) Notice: Under 35 U.S.C. 154(b), the term of this patent shall be extended for 0 days.

(21) Appl. No.: 09/130,182

(22) Filed: Aug. 6, 1998

(30) Foreign Application Priority Data

Aug. 6, 1997 (CN) .............................................. 97 11 6655

(51) Int. Cl.[7] .................................................. B61K 7/02
(52) U.S. Cl. ..................... 104/26.2; 188/281; 188/282.7; 188/282.8; 267/64.12
(58) Field of Search ................................ 188/281, 282.1, 188/282.7, 282.8, 282.9, 300, 269; 267/64.12; 104/26.2

(56) References Cited

U.S. PATENT DOCUMENTS

| 3,361,422 | * | 1/1968 | Theuleau ................................. 267/64 |
| 3,413,930 | * | 12/1968 | Mccune et al. ....................... 104/26.2 |
| 3,637,052 | * | 1/1972 | Bick ........................................ 188/62 |
| 4,122,923 | * | 10/1978 | Ellis et al. ............................. 188/285 |
| 4,721,189 | * | 1/1988 | Bick ........................................ 188/62 |

FOREIGN PATENT DOCUMENTS

| 92232912 | * | 9/1994 | (CN) ............................... B61K/7/16 |
| 2178667Y | * | 10/1994 | (CN) . |

* cited by examiner

Primary Examiner—S. Joseph Morano
Assistant Examiner—Frantz Jules
(74) Attorney, Agent, or Firm—Senniger, Powers, Leavitt & Roedel

(57) ABSTRACT

The invention relates to adjustable stop-wagon retarders with locking function for wagons at high speed and disposal methods thereof, which are suitable for railway marshaling yards or rail lines where it is required to prevent wagons from running away, which are hydraulic equipment of no external energy source to automatically regulate wagon's speed and disposal methods of such equipment. The stop-wagon retarder is characterized in that a uni-directional return unit comprising a sealing valve plate and adjustable throttle valve, and a locking control valve composing of switch valve and positioning unit are mounted in the piston assembly, which make the returning speed and the locking speed for wagon at high speed adjustable, thus the aim of setting the retarder with different control levels and thresholds according to the wagon speed is realized. The disposal method is characterized in that the distances between every two adjacent stop-wagon retarders correspond to the distances between every two adjacent wheel axles.

17 Claims, 4 Drawing Sheets

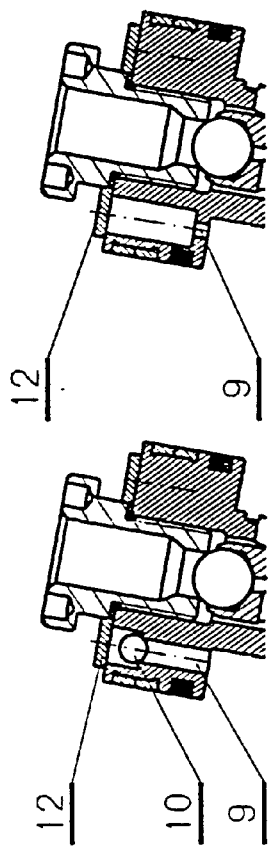
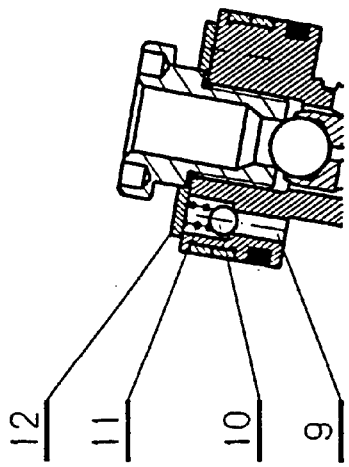
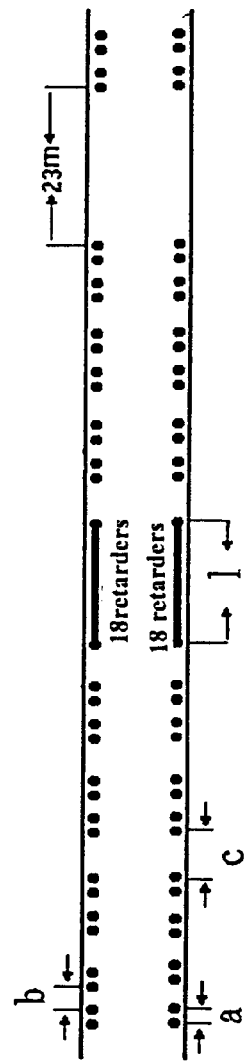

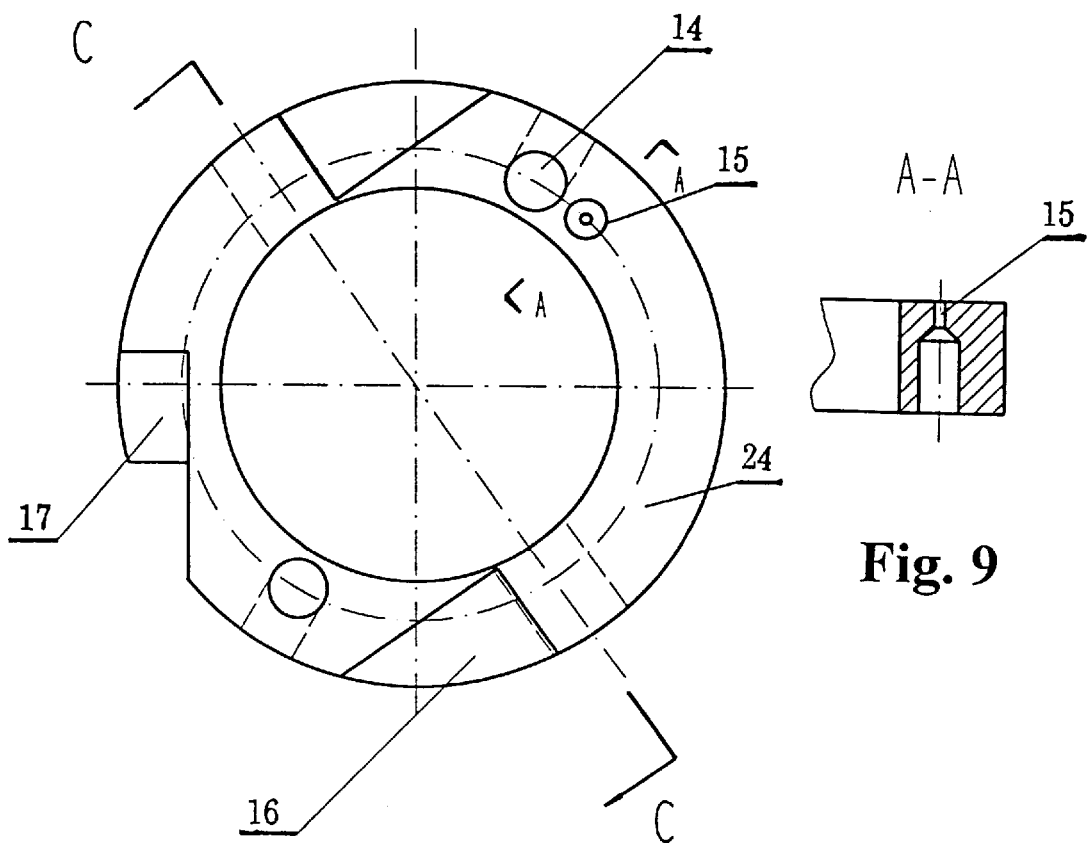
Fig. 7
Fig. 9
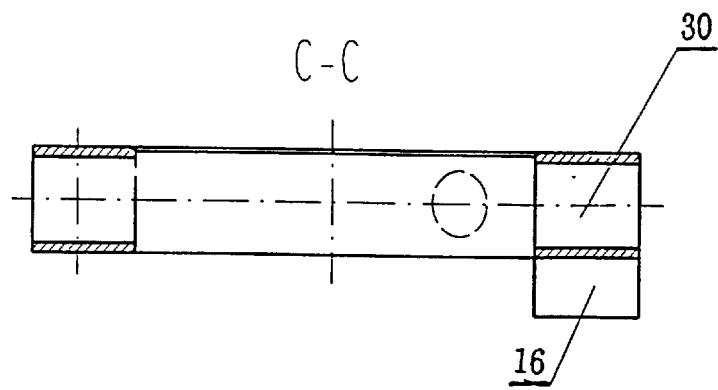
Fig. 8

ADJUSTABLE STOP-WAGON RETARDERS WITH LOCKING FUNCTION FOR WAGONS AT HIGH SPEED AND DISPOSAL METHODS THEREOF

FIELD OF INVENTION

The invention relates to adjustable stop-wagon retarders with locking function for wagons at high speed and disposal methods thereof, which are suitable for railway marshaling yards or rail lines where it is required to prevent wagons from running away, and more particularly, to adjustable stop-wagon retarders which are hydraulic equipment of no external energy source, mounted on the track to automatically regulate wagon's speed and disposal methods of such equipment.

BACKGROUND OF INVENTION

A multifunctional stop-wagon retarder for railway wagon is disclosed in Chinese Pat. No. ZL92232912.5. This retarder can reduce the speed of a wagon, stop a wagon, or prevent a stalled wagon from running away. And it will do work on a wagon at low speed, and be locked by a wagon at high speed. However, the retarder has disadvantages. The structure of its uni-directional return unit makes the normal returning speed of sliding cylinder unadjustable and therefore, the retarder can not have different control levels. The term "control level" means the time necessary for the sliding cylinder of the stop-wagon retarder to return to its original position after it is deflected downwards by a wheel of the wagon. It's locking control valve can not regulate the locking speed and different thresholds for controlling the locking speed can not be set. The connection mode of the positioning unit is complicated and its components are liable to come off, which affects locking precision. And the exhaust hole located rather low in the housing harms its water prevention performance. In addition, existing disposal method for stop-wagon retarders adopts centralized method to dispose large retarder group which can not achieve good retardation on wagons.

SUMMARY OF INVENTION

Accordingly, the first object of the present invention is to provide an adjustable stop-wagon retarder with locking function for a wagon at high speed, which can overcome the above shortcomings of the prior art and can adjust the returning speed and the locking speed of the stop-wagon retarder and therefore, can realize different control levels and thresholds, achieve reliable control and be effective in protecting from water harm.

The second object of the present invention is to provide an optimized disposal method of stop-wagon retarders.

According to the first aspect of the invention, there is provided an adjustable stop-wagon retarder with locking function for a wagon at high speed including a sliding cylinder assembly and a housing assembly having an exhaust unit, the sliding cylinder assembly comprising a cylinder; a piston slidably housed in said cylinder and dividing the cylinder into an upper chamber and a lower chamber; a pressure valve and a locking control valve both disposed coaxially with said piston; an unlocking unit; at least one uni-directional return unit installed on the piston and a sealing gland mounted on the lower end of the cylinder; said sliding cylinder assembly being charged with hydraulic oil and nitrogen and can longitudinally reciprocate between an upper position and a lower position, a portion of said sliding cylinder being disposed in the path of a wheel of said wagon, and said portion when engaged, directly or indirectly, by a wheel being deflected by, and out of the path of, said wheel to permit the wheel to pass the retarder, said uni-directional unit comprises a sealing valve plate and at least one adjustable throttle valve, the sealing valve plate and a pressure valve seat being mounted coaxially on the upper part of the piston with an adjustable gap between the valve plate and the valve seat, and the adjustable throttle valve being disposed under the valve plate for controlling the speed of the hydraulic oil returning to the upper chamber from the lower chamber of the cylinder; said locking control valve comprises a switch valve and at least one positioning unit, said control valve being disposed around the position between the head of the piston and the sealing gland and rotable between an unlock position in which at least one flowing orifice on the switch valve is aligned with the adjustable throttle valve and a lock position in which the flowing orifice is displaced from the adjustable throttle valve, said unlock position and said lock position being limited by at least one positioning unit; the switch valve comprising at least one locking oblique, an unlocking oblique, the flowing orifice and a leaking orifice, the locking oblique being impacted by the hydraulic oil from a piston outlet so that the switch valve rotates in one direction towards the lock position when the wagon travels at a speed higher than a predetermined value; the leaking orifice being aligned with the adjustable valve in the lock position so that the hydraulic oil can slowly return to the upper chamber from the lower chamber, and therefore, the cylinder can slowly return to its upper position; and the unlocking oblique cooperating with said unlocking unit so that the switch valve rotates in a direction opposite said one direction towards the unlock position.

Preferably, the outlet of said exhaust unit is disposed at a high position so as to prevent water from entering the retarder.

In the adjustable stop-wagon retarder with locking function for a wagon at high speed, the adjustable throttle valve can comprise a step-shaped throttle orifice having coaxially a larger diameter upper section and a smaller diameter lower section, and therefore a shoulder being formed therebetween.

The adjustable throttle valve can further comprise a steel ball disposed on the shoulder in the step-shaped orifice.

A compression spring can be disposed in the throttle orifice between the steel ball and the sealing valve plate, biasing the steel ball towards the shoulder.

In the adjustable stop-wagon retarder with locking function for a wagon at high speed, the positioning unit can comprise a positioning lock disposed in the switch valve and two positioning recesses disposed in the piston. The positioning lock comprises a spring seat fixed in a radial orifice in the switch valve; a steel ball installed in the radial orifice and a compression spring disposed in the radial orifice between the steel ball and the bottom of the spring seat, biasing the steel ball so as to engage with one of the recesses in said unlock position and engage with the other of the recesses in said lock position.

In the uni-directional return unit of the stop-wagon retarder according to the present invention, the returning speed can be regulated and different control levels can be achieved by adjusting the gap between the valve plate and pressure valve seat or the diameter of the throttle orifice, or by increasing or decreasing the number of the adjustable throttle valves.

In the locking control valve of the stop-wagon retarder according to the present invention, the locking speed can be regulated by changing the locking force between the positioning lock and positioning recess, increasing or decreasing the number of the positioning units and therefore, different thresholds can be set as required.

According to the second aspect of the invention, there is provided a method for disposing stop-wagon retarders, especially the adjustable stop-wagon retarders with locking function for a wagon at high speed according to the present invention, characterized in that, in at least one section of the track along which stop-wagon retarders are disposed, the distances between every two adjacent stop-wagon retarders correspond to the distances between every two adjacent wheel axles.

It is preferable that two sections, in which the distances between every two adjacent stop-wagon retarders correspond to the distances between every two adjacent wheel axles, are arranged respectively as the entrance section and the exit section of said track along which stop-wagon retarders are disposed, and in the central section between the entrance section and the exit section, stop-wagons retarders are disposed intensively.

A small group of protective stop-wagon retarders can be disposed at a distance from said exit section along the track for preventing uncoupled wagons from running away when hit by the following wagons.

Preferably, the stop-wagon retarders disposed along said track are divided into a plurality of groups in the wagon running direction, the normal returning speed and the locking speed of the stop-wagon retarders in an upstream group are higher respectively than the normal returning speed and the locking speed of the stop-wagon retarders in a downstream group.

The stop-wagon retarders can be disposed on the same side of one rail of said track, or on the inner sides of both rails of said track, or on the outer sides of both rails of said track.

Compared with the existing technology, this invention has the following advantages:

1. The uni-directional returning unit is of adjustable structure, which can meet the need to set the control levels according to returning speed. The sealing valve plate and steel ball provide double sealing effect and therefore improve retardation;
2. The locking control valve can adjust its locking speed and be set to different thresholds, and its positioning unit is of simple and reliable structure. And locking speed is precisely controlled;
3. Exhaust outlet disposed at a higher position is more effective in keeping water, snow and foreign matter from entering the housing;
4. The method for disposing retarders according to the present invention provide a greater retardation than the intensive disposal method.

BRIEF DESCRIPTION OF THE DRAWINGS

FIG. 4, FIG. 5 and FIG. 6 are partial sectional views respectively showing Embodiments 1, 2 and 3.

FIG. 7 is a plan view of the switch valve.

FIG. 8 and FIG. 9 are sectional views respectively along lines of C—C and A—A in FIG. 7.

FIG. 10 is a layout showing an embodiment of the method for disposing the stop-wagon retarders according to the present invention.

DETAILED DESCRIPTION OF THE INVENTION

Embodiment 1

Figure 2:
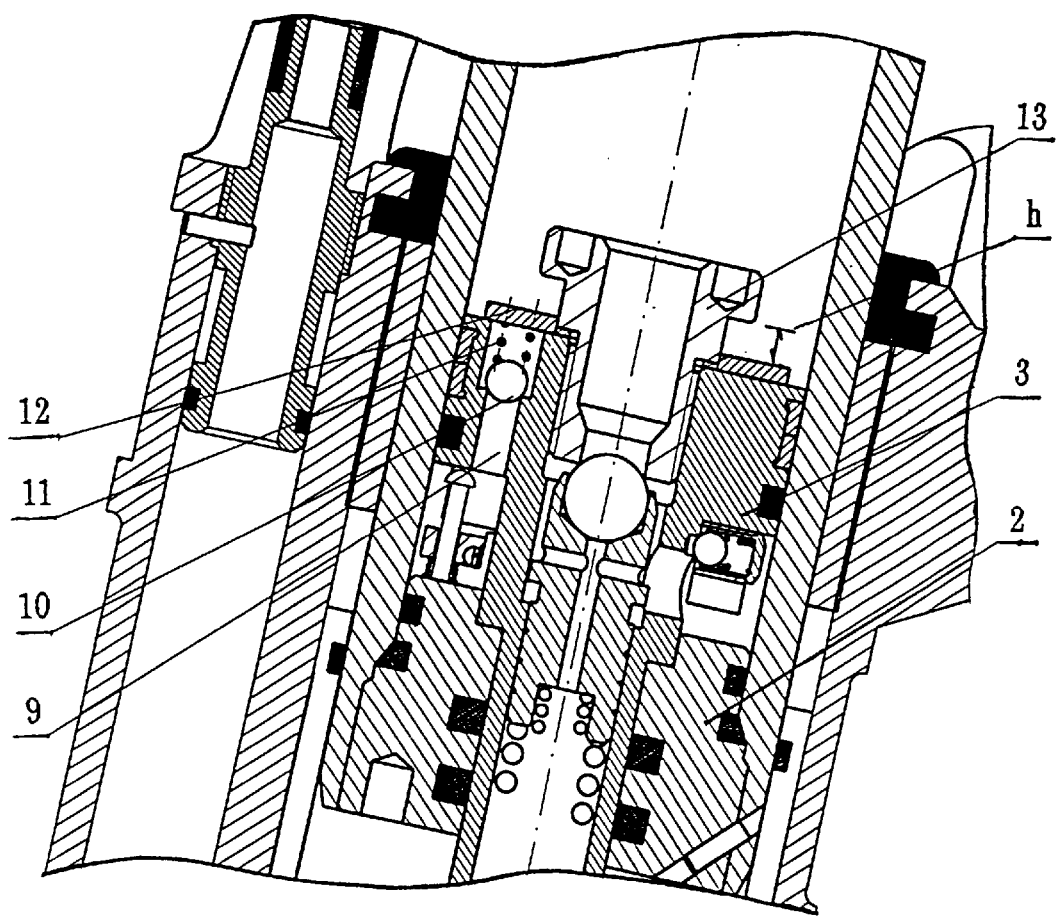
FIG. 2 shows, on an enlarged scale, part of FIG. 1 (including uni-directional returning unit, the locking control valve and unlocking unit).

In Embodiment 1, a sealing valve plate 12 that form part of a uni-directional returning unit, and a pressure valve seat 13 that are mounted coaxially on the top of a piston 3, leaving an adjustable gap h between the sealing valve plate 12 and the pressure valve seat 13. An adjustable throttle valve is mounted under the valve plate 12, forming a passage through the head of the piston 3 in the axial direction. The adjustable throttle valve comprise a step-shaped throttle orifice 9 having coaxially a larger diameter upper section and a smaller diameter lower section, and therefore a shoulder being formed therebetween; a steel ball 10 disposed on the shoulder in the step-shaped orifice 9; and a compression spring 11 disposed in the throttle orifice 9 between the steel ball 10 and the sealing valve plate 12, biasing the steel ball 10 towards the shoulder (FIGS. 2 and 4).

Figure 3:
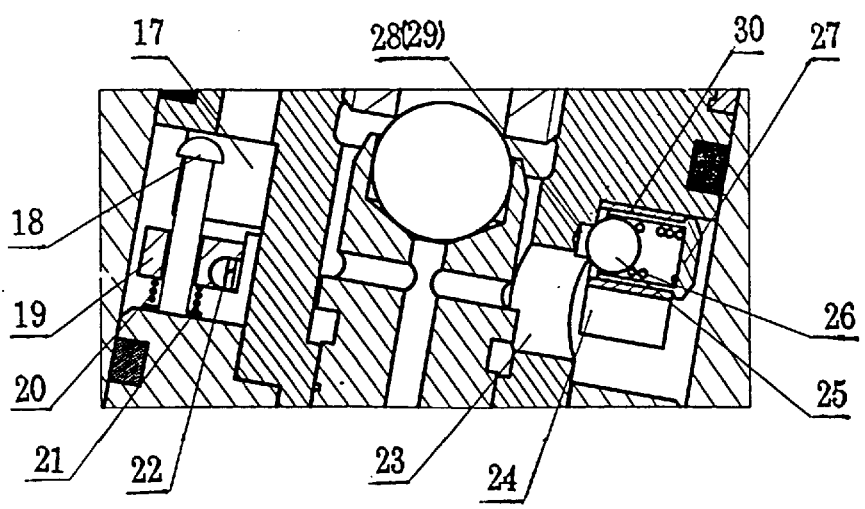
FIG. 3 shows, on an enlarged scale, the block in FIG. 1 (including the positioning unit and the switch valve).

Between the piston head 3 and the sealing gland 2, a locking control valve is installed around the piston and can rotate around the axis. Its rotation angle is limited by a positioning unit. A switch valve 24 is of integral structure, including at least one locking oblique 16, an unlocking oblique 17, at least one flowing orifice 14 and a leaking orifice 15. And the positioning unit comprises positioning locks 25, 26 and 27 located on the switch valve and positioning recesses 28 and 29 on the piston. When the locking control valve rotates around the axis clockwise or anti-clockwise, the flowing orifice 14 on the switch valve will accordingly open to or shut off from the throttle orifice 9 of the adjustable throttle valve, that is, in the unlock or lock positions (FIG. 2, FIG. 7 FIG. 8 and FIG. 9). Each set of positioning unit has one positioning lock and two positioning recesses. The positioning lock is formed by a positioning steel ball 25, a positioning spring 26 and spring seat 27 which are mounted inside a radial positioning orifice 30 of the switch valve 24 in sequence. The spring seat 27 is fastened in the switch valve 24. The shape and location of positioning recesses 28 and 29 that are arranged on the same cycle around the piston, match with the positioning steel ball 25, and the pitch between the positioning recesses ensures that the flowing orifice 14 can fully open to or shut off from the throttle orifice 9 of the adjustable throttle valve, when the locking control valve rotates around the axis clockwise or anti-clockwise (FIG. 3 and FIG. 2).

Figure 1:
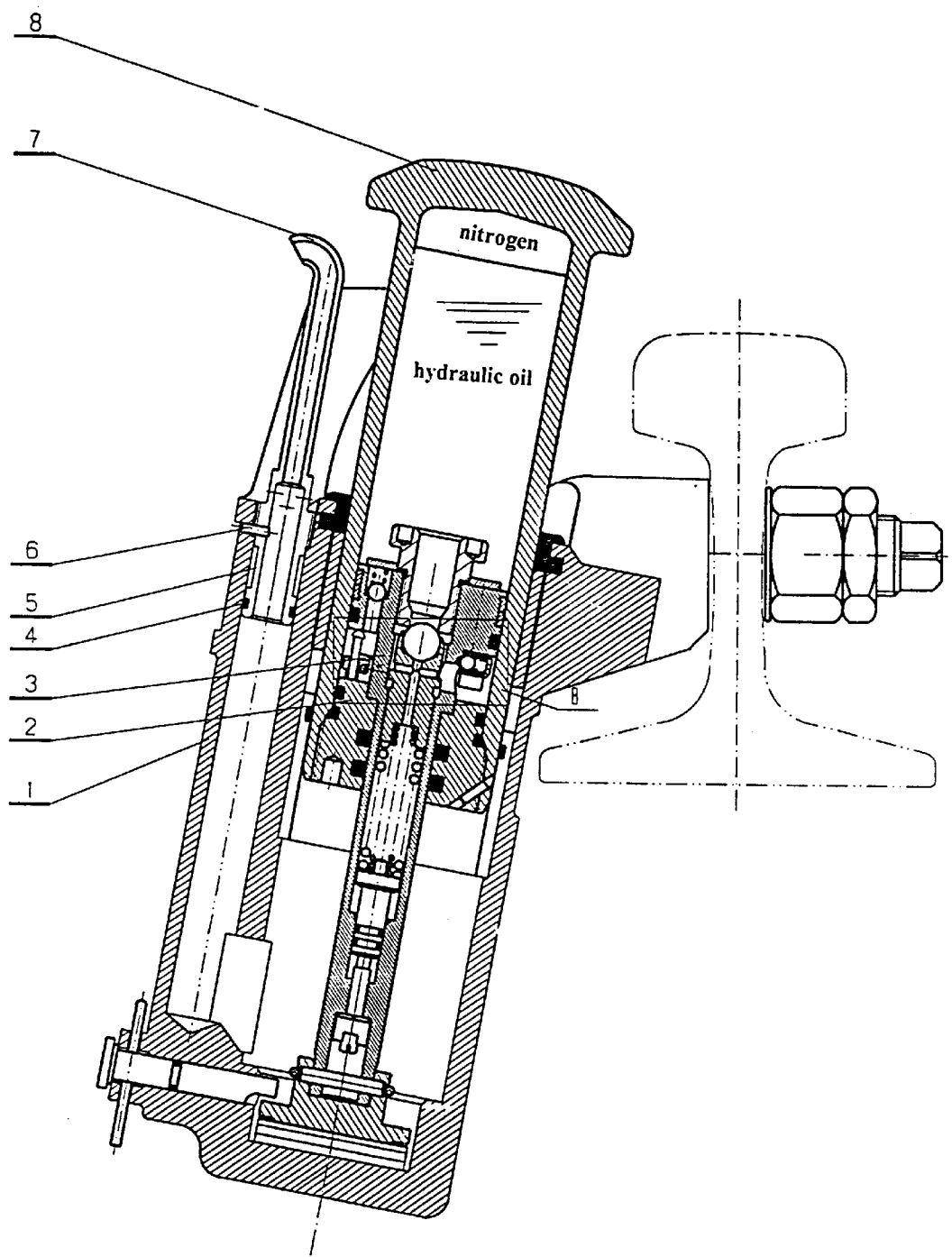
FIG. 1 is an elevational section of the general structure of the adjustable stop-wagon retarder with locking function for a wagon at high speed according to the present invention.

The unlocking unit in this embodiment is of the basic structure in the existing technology, that is, it comprises a pusher 18, pilot sleeve 19 and a binding screw 22. In this invention, it further comprises a restoring spring 20 and a collar 21 to improve automatic restoring function of the unlocking unit (FIG. 3). An exhaust unit disposed in the upper part of the housing is comprises a sealing ring 4, a high exhaust seat 5, a positioning pin 6 and a high exhause pipe 7 (FIG. 1).

Embodiment 2

The structure of this embodiment is similar to that of Embodiment 1 except that the adjustable throttle valve only has a step-shaped throttle orifice 9 having coaxially a larger diameter upper section and a smaller diameter lower section, a steel ball 10 and a sealing valve plate 12 (FIG. 5).

Embodiment 3

The structure of this embodiment is similar to that of Embodiment 1 except that the adjustable throttle valve only has a step-shaped throttle orifice 9 having coaxially a larger diameter upper section and smaller diameter lower section and a sealing valve plate 12 (FIG. 6).

In this invention, the number of the adjustable throttle valves should be decided by the normal returning speed of the stop-wagon retarder, scaling up with the returning speed. And from the above Embodiments, it is known that increasing the adjustable gap h between the sealing valve plate 12 and the pressure valve seat 13, reducing the force of spring 11, and enlarging aperture of throttle orifice 9, can all enhance the normal returning speed of the cylinder; and in opposite ways the returning speed can be lowered. By regulating the above factors in a comprehensive way, the normal returning speed can be changed as required and the control levels set according to the normal returning speed.

The number of the positioning units in the locking control valve should be dependent on the locking speed of the stop-wagon retarder, scaling up with the locking speed. And from the above Embodiments, it is known that increasing the force of the positioning spring 26 or the depth of the positioning recesses 28 and 29 can enhance the locking speed; and in opposite ways the locking speed can be lowered. By regulating the above factors in a comprehensive way, the locking speed can be changed as required and the thresholds set according to the speed.

The following is a brief introduction to the operation of the adjustable stop-wagon retarder with lock function for wagons at high speed:

1. Retardation status: In the static condition, fluid in the upper and lower chambers of the cylinder 8 has equal pressure, the flowing orifice 14 on the switch valve 24 is open to the throttle orifice 9 of the adjustable throttle valve, and the locking control valve is in the unlocking position. When a wagon hit the retarder at a comparatively low speed, the wheel will press the cylinder head and the cylinder moves downwards. Therefore, the fluid in the upper chamber can not enter the lower chamber due to isolation of the sealing valve plate 12 and the steel ball 10. The cylinder will continue to move downwards and the upper chamber become smaller, till the compressed nitrogen forces the pressure valve open, that is, a retardation is exerted on the wheel. Then the fluid in the upper chamber will flow out through the pressure valve and a piston outlet 23. As the wagon travels at low speed, the fluid flows slowly and can not move the switch valve. The fluid in the lower chamber can flow through the flowing orifice 14 and the throttle orifice 9 to push open the steel ball 10 and quickly back to the upper chamber to restore the cylinder rapidly. And the same process is repeated for the following wheels.

2. Locking status for wagon at high speed: When a wagon hits the retarder at a rather high speed, the first wheel will press the cylinder and the retarder exerts retardation on the wheel. As the wagon travels fast, fluid from piston outlet 23 will rush to the locking oblique 16 on the switch valve 24. The impact is larger than the locking force between the positioning steel ball 25 and the positioning recess 28, and the switch valve is forced to rotate anti-clockwise, and the flowing orifice 14, the leaking orifice 15 and the positioning lock also move. Positioning steel ball 25 moves into the positioning recess 29. At this time, since the oblique 16 moves away from the piston outlet 23 and the fluid can no more rush to the oblique, the switch valve will stop rotation under the locking force of the positioning steel ball and the positioning recess. The flowing orifice 14 is now shut off from the throttle orifice 9, the leaking orifice 15 is open to the throttle orifice 9, and the locking control valve is in the locking position. The aperture of the leaking orifice 15 is so small that fluid from the lower chamber could only flow very slowly to the upper chamber, which means the cylinder 8 will be locked at the position lower than the top of rail and the retarder will not exert retardation against the following wheels.

3. Automatic unlocking: When the track is clear, under the pressure of expansion of nitrogen, fluid in the lower chamber of the cylinder flows slowly back to the upper chamber via the leaking orifice 15, the throttle orifice 9, the steel ball 10 and the sealing valve plate 12. The cylinder slowly moves upwards. And the sealing gland 2 moves up accordingly. When the gland 2 approaches the highest point, the top surface of the gland 2 will force the pusher 18 to move up. The upmost top of the pusher 18 will reach the unlocking oblique 17 on the switch valve 24 and force the switch valve 24 rotate clockwise. So the flowing orifice 14, the leaking orifice 15 and the positioning lock on the valve change their positions accordingly, and the positioning steel ball 25 moves back into the positioning recess 28. And under the action of restoring spring 20, the pusher 18 is automatically restored. The locking force between the positioning steel ball and the positioning recess make the switch valve stop rotating. The flowing orifice 14 on the switch valve is open to the throttle orifice 9 now, and the locking control valve returns to unlocking position. Thus the stop-wagon retarder is automatically unlocked.

4. Holding status: When a wheel stops at the retarder, the cylinder can not move upwards under the pressure of the wheel. Nitrogen in the upper chamber is compressed, which makes the pressure in the upper chamber higher than that of the lower chamber. And the sealing plate and sealing ring prevent the fluid in the upper chamber from entering the lower chamber, that is, the cylinder exerts a certain retarding force against the wheel for rather a long time, so that the wagon is prevented from running away.

Embodiment 4

FIG. 10 shows arrangement of the adjustable stop-wagon retarders with locking function for wagons at high speed, along a railway track so as to prevent Chinese 4-axle wagons from running away.

The retarders are symmetrically disposed on the inner sides of both rails of the track. The distance a between each pair of retarders is 1.75 m, the distance b between every two pairs of retarders 2.97 m, and the distance c between every two adjacent groups of retarders 6.9 m. In the central section of the track section where the retarders are arranged, 18 pairs of retarders are intensively disposed. The central section extends a length l of 11 m. A plurality of protective retarders are set at a distance of 23 m to the end of said track section. The above arrangement is mainly based on the fact that for the 4-axle wagons of the Chinese Railways, the distance between axles in each bogie is 1.75 m, the distance between the inner axles of two adjacent bogies 6.9 m, and the distance between the last wheel of the previous wagon and the first wheel of the following wagon 2.97 m. The number of retarders is calculated on the gradient of the track profile, the weight and quantity of stalled wagons and the traveling resistance of wagons. The purpose of the 18 pairs of retarders intensively disposed in the central section is to enhance the total braking capacity of these retarders. And for the sake of transport safety, protective retardes are set to prevent uncoupled wagons from running away when hit by the following wagons.

The disposal method according to the present invention is also applicable to other types of stop-wagon retarders or anti-runaway equipment.

What is claimed is:

1. An adjustable stop-wagon retarder with locking function for a wagon at high speed including a sliding cylinder assembly and a housing assembly having an exhaust unit, the sliding cylinder assembly comprising a cylinder having an upper end and a lower end; a piston slidably housed in said cylinder and dividing the cylinder into an upper chamber and a lower chamber; a pressure valve and a locking control valve both disposed coaxially with said piston; an unlocking unit; at least one uni-directional return unit installed on the piston and a sealing gland mounted on the lower end of the cylinder; said sliding cylinder assembly being charged with hydraulic oil and nitrogen and can longitudinally reciprocate between an upper position and a lower position, a portion of said sliding cylinder being disposed in the path of a wheel of said wagon for retarding the speed of said wagon when said wheel engages said portion, said uni-directional unit comprising a sealing valve plate and at least one adjustable throttle valve, the sealing valve plate and a pressure valve seat being mounted coaxially on the upper part of the piston with an adjustable gap between the valve plate and the valve seat, the adjustable throttle valve being disposed under the valve plate for controlling the speed of the hydraulic oil returning to the upper chamber from the lower chamber of the cylinder, the sealing valve plate being longitudinally movable along the axis of the piston between the valve seat and adjustable throttle valve; said adjustable throttle valve comprising a throttle orifice, a ball removably disposed in the throttle orifice, and a biasing member removably disposed in the throttle orifice between the ball and the sealing valve plate biasing the ball towards a closed position, the biasing member having a spring force selected to control the speed of movement of the cylinder from the lower position to the upper position;

said locking control valve comprising a switch valve and at least one positioning unit, said control valve being disposed around the piston between the head of the piston and the sealing gland and rotatable between an unlocked position in which at least one flowing orifice on the switch valve is aligned with the adjustable throttle valve and a locked position in which the flowing orifice is shut off from the throttle orifice, said unlocked position and said locked position being limited by at least one positioning unit; the switch valve comprising at least one locking oblique, an unlocking oblique, the flowing orifice and a leaking orifice, the locking oblique being impacted by the hydraulic oil from a piston outlet so that the switch valve rotates in one direction towards the locked position when the wagon travels at a speed higher than a predetermined value; the leaking orifice being aligned with the adjustable throttle valve in the locked position so that the hydraulic oil can slowly return to the upper chamber from the lower chamber, and therefore, the cylinder can slowly return to its upper position; and the unlocking oblique cooperating with said unlocking unit so that the switch valve rotates in a direction opposite said one direction towards the unlocked position.

2. An adjustable stop-wagon retarder with locking function for a wagon at high speed as defined in claim 1, wherein the outlet of said exhaust unit is disposed at a high position so as to prevent water from entering the retarder.

3. An adjustable stop-wagon retarder with locking function for a wagon at high speed as defined in claim 1, wherein said positioning unit comprises a positioning lock disposed on the switch valve and two positioning recesses disposed in the piston, said positioning lock comprising a spring seat fixed in a radial orifice in the switch valve; a ball installed in the radial orifice and a compression spring disposed in the radial orifice between the ball and the bottom of the spring seat biasing the ball so as to engage with one of said positioning recesses in said unlocked position and engage with the other of said positioning recesses in said locked position.

4. An adjustable stop-wagon retarder with locking function for a wagon at high speed as defined in claim 1 having a plurality of adjustable throttle valves for increasing the speed of movement of the cylinder from the lower position to the upper position.

5. A method for disposing stop-wagon retarders to retard the speed of a wagon moving along a track, the method comprising providing adjustable stop-wagon retarders with locking function for a wagon at high speed as set forth in claim 1 and disposing the stop-wagon retarders along a section of the track such that the distance between at least some adjacent stop-wagon retarders corresponds to the distance between two adjacent wheel axles of the wagon.

6. A method as defined in claim 5, further comprising disposing stop-wagon retarders along the section of track such that at the entrance and exit of the section of track the distance between adjacent stop-wagon retarders corresponds to the distance between two adjacent wheel axles and in a central portion of the section of track between said entrance and exit stop-wagon retarders are disposed such that the distance between adjacent stop-wagon retarders is less than the distance between two adjacent wheel axles.

7. A method as defined in claim 6, wherein another group of protective stop-wagon retarders are disposed along the track outside the exit of the section of track for preventing uncoupled wagons from running away when hit by following wagons.

8. A method as defined in claim 5, wherein the stop-wagon retarders disposed along said track are divided into a plurality of groups in the wagon running direction, the normal returning speed and the locking speed of the stop-wagon retarders in an upstream group are higher respectively than the normal returning speed and the locking speed of the stop-wagon retarders in a downstream group.

9. A method as defined in claim 5, wherein the stop-wagon retarders are disposed on the same side of one rail of said track.

10. A method as defined in claim 5, wherein the stop-wagon retarders are disposed on the inner sides of both rails of said track.

11. A method as defined in claim 5, wherein the stop-wagon retarders are disposed on the outer sides of both rails of said track.

12. An adjustable stop-wagon retarder with locking function for a wagon at high speed including a sliding cylinder assembly and a housing assembly having an exhaust unit, the sliding cylinder assembly comprising a cylinder having an upper end and a lower end; a piston slidably housed in said cylinder and dividing the cylinder into an upper chamber and a lower chamber; a pressure valve and a locking control valve; an unlocking unit; at least one uni-directional return unit installed on the piston and a sealing gland mounted on the lower end of the cylinder; said sliding cylinder assembly being charged with hydraulic oil and a gas, and capable of longitudinally reciprocating between an upper position and a lower position, a portion of said sliding cylinder being adapted for positioning in the path of a wheel of said wagon for retarding the speed of said wagon when said wheel engages said portion, said uni-directional return unit comprising a sealing valve plate and at least one adjustable throttle valve disposed under the valve plate for controlling the speed of the hydraulic oil returning to the upper chamber from the lower chamber of the cylinder, the valve plate being longitudinally movable along the axis of the piston between the valve seat and adjustable throttle valve;

said locking control valve comprising a switch valve including a flowing orifice and a leaking orifice and at least one positioning unit, said control valve being disposed around the piston between the head of the piston and the sealing gland and rotatable between an unlocked position in which the flowing orifice is aligned with the adjustable throttle valve and a locked position in which the flowing orifice is shut off from the adjustable throttle valve and the leaking orifice is aligned with the adjustable throttle valve so that the hydraulic oil can slowly return to the upper chamber from the lower chamber, and therefore, the cylinder can slowly return to its upper position, said unlocked position and said locked position being limited by at least one positioning unit; the switch valve being impacted by the hydraulic oil from a piston outlet so that the switch valve rotates in one direction towards the locked position when the wagon travels at a speed higher than a predetermined value; said positioning unit comprising a resilient positioning lock disposed on said switch valve and positioning recesses disposed in said piston, said positioning lock being adapted to cooperate with the corresponding positioning recess to releasably hold the switch valve in said locked or unlocked positions.

13. An adjustable stop-wagon retarder with locking function for a wagon at high speed as defined in claim 12, wherein said positioning lock comprises a spring seat fixed in a radial orifice in the switch valve; a ball removably disposed in the radial orifice and a compression spring removably disposed in the radial orifice between the ball and the bottom of the spring seat, the compression spring biasing the ball so as to engage with one of said positioning recesses in said unlocked position and engage with the other of said positioning recesses in said locked position.

14. An adjustable stop-wagon retarder with locking function for a wagon at high speed as defined in claim 12, wherein said adjustable throttle valve comprises a throttle orifice, a ball removably disposed in the throttle orifice, and a biasing member removably disposed in the throttle orifice between the ball and the sealing valve plate biasing the ball towards a closed position, the biasing member having a spring force selected to control the speed of movement of the cylinder from the lower position to the upper position.

15. An adjustable stop-wagon retarder with locking function for a wagon at high speed as defined in claim 14 having a plurality of positioning units for increasing the locking speed of the stop wagon retarder.

16. An adjustable stop-wagon retarder with locking function for a wagon at high speed comprising:

a housing;

a piston;

a cylinder in said housing and slidably disposed around said piston, said cylinder having an upper end, a lower end and a portion being adapted for positioning in the path of a wheel of said wagon for retarding the speed of said wagon when said wheel engages said portion;

said cylinder being charged with hydraulic fluid and being capable of longitudinally reciprocating between an upper and a lower position;

said piston dividing said cylinder into an upper chamber and a lower chamber and having a piston outlet for fluid flow from said upper chamber of said cylinder to said lower chamber of said cylinder;

a uni-directional return unit on said piston for fluid flow from said lower chamber of said cylinder to said upper chamber of said cylinder;

a locking control valve on said piston for restricting the rate of fluid flow from said lower chamber of said cylinder through said uni-directional return unit to said upper chamber of said cylinder, said locking control valve having an unlocked position allowing a first higher rate of fluid flow from said lower chamber of said cylinder through said uni-directional return unit, and a locked position allowing a second lower rate of fluid flow from said lower chamber of said cylinder through said uni-directional return unit;

said locking control valve being responsive to fluid flow such that when said wagon's speed is higher than a predetermined speed fluid flow forces said locking control valve to said locked position;

a positioning unit for releasably holding said locking control valve in said locked and unlocked positions, the positioning unit comprising a resilient positioning lock and two positioning recesses disposed in said piston at locations corresponding to said locking control valve's locked and unlocked positions;

said positioning lock being disposed on said locking control valve and adapted to cooperate with the corresponding positioning recess to releasably hold the locking control valve in said locked and unlocked positions; and an unlocking unit for forcing said locking control valve to said unlocked position when said cylinder approaches said upper position.

17. An adjustable stop-wagon retarder with locking function for a wagon at high speed comprising:

a housing;

a piston;

a cylinder in said housing and slidably disposed around said piston, said cylinder having an upper end, a lower end and a portion being adapted for positioning in the path of a wheel of said wagon for retarding the speed of said wagon when said wheel engages said portion;

said cylinder being charged with hydraulic fluid and being capable of longitudinally reciprocating between an upper and a lower position;

said piston dividing said cylinder into an upper chamber and a lower chamber and having a piston outlet for fluid flow from said upper chamber of said cylinder to said lower chamber of said cylinder;

a uni-directional return unit on said piston for fluid flow from said lower chamber of said cylinder to said upper chamber of said cylinder comprising an adjustable throttle valve, a sealing valve plate, and a pressure valve seat;

said sealing valve plate and said pressure valve seat being mounted coaxially on said piston above said adjustable throttle valve;

said sealing valve plate being longitudinally movable along the axis of said piston between said pressure valve seat and said adjustable throttle valve; and said adjustable throttle valve comprising a throttle orifice, a ball removably disposed in said throttle orifice, and a biasing member removably disposed in said throttle orifice between said ball and said sealing valve plate biasing said ball towards a closed position, said biasing member having a spring force selected to control the speed of movement of said cylinder from said lower position to said upper position.

* * * * *